United States Patent [19]

Walz

[11] Patent Number: 4,504,445

[45] Date of Patent: Mar. 12, 1985

[54] METHOD AND APPARATUS FOR GENERATING ULTRAVIOLET RADIATION AND OZONE

[76] Inventor: Alfred Walz, Am Kurzarm 7, D-7830 Emmendingen, Fed. Rep. of Germany

[21] Appl. No.: 529,507

[22] Filed: Sep. 6, 1983

[30] Foreign Application Priority Data

Sep. 3, 1982 [DE] Fed. Rep. of Germany ....... 3232802

[51] Int. Cl.³ ................ B01J 1/10

[52] U.S. Cl. ................ 422/186.15; 204/176; 210/760; 422/186.07; 422/186.3

[58] Field of Search ................ 204/157.1, 176; 210/760; 422/186.07, 186.15, 186.3

[56] References Cited

U.S. PATENT DOCUMENTS 4,273,660 6/1981 Beitzel ................ 210/760

4,417,966 11/1983 Krauss et al. ................ 422/186.15 X 4,427,636 1/1984 Obenshain ................ 422/186.07

*Primary Examiner*—Leland A. Sebastian

*Attorney, Agent, or Firm*—Browdy and Neimark

[57] ABSTRACT

Ultraviolet radiation is the wavelength range between 150 and 300 nanometers, which both generates ozone ($O_3$) and has a germicidal effect both in ambient air and in a pure oxygen atmosphere, is performed in a highly energy-efficient manner, by utilizing a low-voltage, low-pressure gas discharge lamp, by using a radiation-transparent quartz tube, by equipping it with a long-lasting sintered electrode pair and filling it with a mixture of gas vapor and mercury vapor, by disposing a circuit device between the mains and the gas discharge tube which rectifies the mains alternating current and effects smoothing voltage multiplication, and by coupling this circuit device with an automatic, dry-switching commutator device for the direct current of the gas discharge lamp, in order in principle to avoid a mercury-vapor dissociation (cataphoresis) which would reduce the effectiveness of the radiation. As a result of the direct current operation, the energy efficiency of the UV radiation generator is improved by up to 30%, as compared with direct operation of the gas discharge lamp with alternating current and a standard alternating current choke, because of the reduction in heat losses both in the gas discharge process and in the voltage multiplier choke.

7 Claims, 1 Drawing Figure

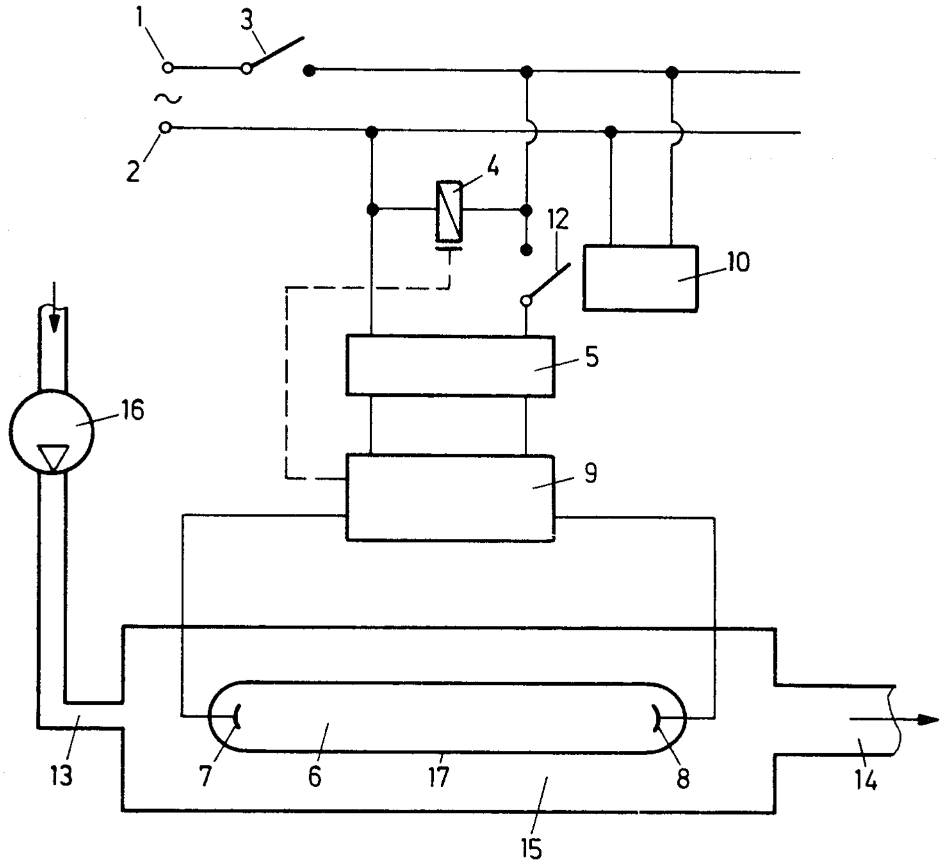
1
3
2
4
12
10
5
16
9
13
7
6
17
8
14
15

METHOD AND APPARATUS FOR GENERATING ULTRAVIOLET RADIATION AND OZONE

FIELD OF THE INVENTION

The invention relates to a method for generating ultraviolet radiation, preferably in the wavelength range between approximately $\lambda=150$ and $\lambda=300$ nanometers, where ozone is produced at about $\lambda=185$ nm and germicidal radiation is produced at about $\lambda=260$ nm, from electrical energy which is converted into radiation energy in low-voltage gas discharge tubes each having one pair of electrodes. The walls of these tubes are made of a material highly transparent to the above $\lambda$ range, and the interiors are filled with a corresponding mixture of gas vapor and mercury vapor. The method is preferably used for water purification.

BACKGROUND OF THE INVENTION

For purifying waste water, for recovering water in the field of drinking water, or for cleaning and maintaining swimming pools, it is known to chlorinate the water. The use of chlorine is associated with certain disadvantages, however, such as skin and eye irritation and unpleasant odors.

It is also known to add hypochlorite to the water instead of chlorine, the sodium hypochlorite being produced by electrolysis from table salt.

Performing water treatment, disinfection and the like by means of ozone is also known, in which case the unpleasant side effects of chlorine do not occur. The generation of ozone from the oxygen component of air is effected by corona discharges with high voltage (for instance 15,000 volts), the generation of the high voltage being effected via single-phase air-cooled transformers.

It is also known to produce ozone by means of peak disharges. In these two last methods, the expenditure of energy is relatively high. The capital investment required for the electrical plant is correspondingly quite high.

It is further known, from U.S. Pat. No. 4,273,660, to purify water by the action of ultraviolet light and by ozone, where UV light is generated in a gas discharge lamp and $O_2$ is converted into $O_3$ with the aid of the UV light; the ozone is added to the water which is to be purified, and then the water-ozone mixture is in turn passed along the gas discharge lamp.

SUMMARY OF THE INVENTION

It is accordingly the principal object of the present invention to optimize the method described at the outset above, to reduce investment and operating costs, and to lengthen the service life of the apparatus used.

It is a further object of the invention to improve the process of obtaining ozone by means of a UV rays of a gas discharge lamp such that the ozone yield is increased in proportion to the energy consumed—that is, that for a given ozone yield the use of energy will be decreased—and to simplify the operation of the gas discharge lamp (a mercury vapor lamp, for example) furnishing the UV radiation.

This object is attained in accordance with the invention substantially in that the gas discharge lamp is powered by an alternating current source (50 or 60 Hz), using a supply circut device dimensioned for the maintaining current and maintaining voltage, in the form of a voltage multiplier circuit made up of recitifier diodes and capacitors, and at least one ignition circuit furnishing high voltage but itself being of lower power by comparison. The supply circuit and the ignition circuit are combined into a voltage multiplier circuit comprising a plurality of voltage stages connected in series. Direct current operation is attained, using a smoothing choke.

At wavelengths of approximately $\lambda=185$ nm, highly oxidizing ozone ($O_3$) is produced from the oxygen component of the air. At somewhat longer wavelengths, especially at about $\lambda=260$ nm, the UV radiation has a highly germicidal effect against bacteria and viruses. Both effects of such UV radiation, that is, the generation of ozone as a highly oxidizing agent and the germicidal effect, have become quite important in recent years in water management, both in chemistry and in process technology.

Previously conventional methods for purifying water and waste water with chemicals such as chlorine compounds and recycling it for re-use are increasingly being replaced by ozone and UV-radiation treatment methods which do not have undesirable side effects on humans or on the environment. For instance, after ozone has accomplished its highly oxidizing effect it is converted into water.

By using a direct current multiplier in accordance with the invention, the relatively high voltage of the gas discharge lamp which is generally required for ignition is assured, while the comparatively low maintaining voltage is produced anyway without requiring special provisions.

With this method, in a gas discharge lamp depending on its gas contents, UV radiation is generated which is capable of emerging from the tube housing, which is of quartz or quartz glass, and upon meeting $O_2$ is capable of generating $O_3$ therefrom. Ozone is an extraordinarily powerful oxidizing agent for water treatment and can be added in any required amount to the water being purified.

This low-voltage generation of UV radiation accomplished with the method according to the invention is improved in terms of specific energy consumption and capital investment costs to such an extend that it is competitive, in its present state of development, with the corona discharge method. Gas discharge lamps and UV radiation lamps have previously been operated directly with alternating current from conventional supply mains (for instance at 220 V and 50 Hz) via low-voltage transformers and stabilizing chokes. For a quartz tube of a one-meter length and an inside diameter of 15 mm (wall thickness approximately 1.00 mm) of special quartz material, which is available in commerce under the name "Suprasil", and with a pair of standard spiral electrodes, the maintaining voltage amounts to approximately 90 V at a current of about 0.5 amp. For igniting the discharge, the spiral electrodes have to be preheated, for instance with the aid of the usual glow-starting principle used for fluorescent lamps. The UV radiation intensity in a first approximation obeys the sine-wave principle of the current and thus when averaged in time over the alternating current period is proportional to the arithmetical average value $I_{ar}$ of one-half a current wave. The electrical energy converted into useless heat in the tube is proportional to the effective value $I_{eff}$ of the one-half current wave. The following equation applies:

$I_{eff}/I_{ar}=1/\sqrt{2}/2/\pi=1.11.$

If the discharge tube experiences a flow not of a sinusoidal alternating current but rather of direct current, then $I_{eff}/I_{ar}$ would equal 1; in other words, there would be a savings of 11% with an identical radiation yield. In actual practice, the improvement using direct current operation is even very much greater. The gas discharge in the case of alternating current is extinguished even before the zero pause of the current and then resumes after this zero pause only when the sinusoidal mains voltage has increased to a certain reignition level. In the interim, no discharge occurs and accordingly no generation of radiation takes place.

Reignition necessitates a new buildup of the gas ionization, which was lost in the current pause as a result of the recombination of the charge carriers. The energy loss thereby occurring in radiation generation, which is avoidable by means of direct current operation, amounts to approximately 10 to 15%. Thus the radiation yield with direct current operation as compared to alternating current operation increases by approximately 20 to 25%.

Direct current can be generated from alternating current almost without loss, using the rectifier-multiplier circuit according to German Pat. No. 1 639 108, such that even an idling voltage which is substantially higher than the maintaining voltage, of 1200, 1800, 2400 V and more, for example, becomes available briefly for the purpose of ignition.

This rectifier-multiplier device, including a current smoothing inductance, then results in losses that are lower by a further few percent as compared with a standard alternating current choke. If a UV radiation lamp is operated with this rectifier-multiplier circuit, a radiation yield which is approximately 30% higher can thus be attained.

Should it be that a particular ozone quantity, such as 10 g/h, is to be attained with a UV radiation system, then the dimensions of the system (that is, the number of radiation tubes of Suprasil quartz and the number of rectifier-multiplier circuits) can be selected to be smaller by about 30% than in the case of alternating current operation. The result is a substantial reduction in capital investment costs for the system as a whole.

In accordance with one embodiment of the method according to the invention, it is advantageous for a commutator switch disposed between the rectifier-multiplier circuit and the gas discharge lamp to be switched over dry after a mains switch has been actuated, and for a delay switch disposed in a supply line to the rectifier-multiplier circuit to be switched ON in a delayed manner after the closure of the mains switch. Upon each closure of the mains switch, a switchover of the gas discharge lamp while inactive is effected, and the lamp is made to ignite and burn by the rectifier/voltage-multiplier circuit. A cataphoresis effect in the gas discharge lamp operated on direct current is thereby avoided.

Operating costs are reduced if cold-start sintered electrodes are used in this method for the gas discharge lamp.

The use of long-lasting cold-start sintered electrodes for the UV radiation tubes instead of the conventional preheated spiral electrodes increases the service life of these relatively expensive tubes by a factor of at least two or three (for instance, from about 7,000 hours to about 14,000 to 20,000 hours).

The invention also relates to an apparatus or circuit device for generating ultraviolet radiation in the wavelength range between approximately $\lambda=150$ and $\lambda=300$ nm from electrical energy converted into radiation energy in low-voltage gas discharge lamps each having one pair of electrodes. In the wavelength range of $\lambda=185$ nm, ozone is produced, and germicidal, radiation is produced in the wavelength range of $\lambda=260$ nm. The material making up the walls of these gas discharge tubes is known per se and highly transparent to the above wavelength range, and the interior of the tubes is filled with a mixture known per se of gas vapor and mercury vapor. The apparatus is preferably used for purifying water, in particular in accordance with the method of the present invention.

In order to increase the ozone yield or to reduce the energy requirement, the above-described apparatus is embodied in accordance with the invention by a gas discharge lamp in a treatment chamber having an air supply tube and an air exhaust tube, a gas-filled tube transparent to UV radiation and electrodes; the lamp is supplied with electricity by a direct-voltage multiplier circuit from a mains network of alternating current, having an ON switch.

It is particularly advantageous if a commutator switch is disposed between the direct-voltage multiplier circuit and the gas discharge lamp, the commutator switch being actuated by an exciter coil, and if a delay circuit is disposed in the supply line of the rectifier-multiplier circuit, the delay circuit switching the direct-voltage multiplier circuit, via a controlled working contact, in a delayed manner as compared with the commutation process.

The proportion of ozone generated in the air passed through the treatment chamber can be controlled by providing in a further characteristic of the present invention that a controllable compressor be disposed in the air supply line leading to the treatment chamber.

Particularly good starting and long service life of the gas discharge lamp are attained if in accordance with a further characteristic of the invention a gas discharge lamp is used in the described apparatus or circuit device which has cold-start sintered electrodes known per se (from U.S. Pat. No. 3,325,281) as its electrodes.

Further details, advantages and characteristics of the invention will now be described, referring to the drawing, which shows one exemplary embodiment of an apparatus or circuit device according to the invention.

BRIEF DESCRIPTION OF THE DRAWING

The single FIGURE of the drawing is a schematic view of an apparatus or circuit device for generating ozone from oxygen, in particular the oxygen in the air, by means of UV radiation from a gas discharge lamp.

DESCRIPTION OF THE PREFERRED EMBODIMENT

The ozone is generated from the oxygen in the air, which is in the flow of air passing through a treatment chamber 15 having an air supply tube 13 and an air exhaust tube 14.

The generation of the ozone is effected by the action of UV radiation, which is generated in a gas discharge lamp 6 having electrodes 7, 8 and emerges from the UV-transparent glass tube 17, made for instance of quartz glass, which embodies the gas discharge lamp 6.

The air flow passed through the treatment chamber 15 may be increased or accelerated by a compressor 16 disposed in the air supply line 13.

The gas discharge lamp 6 is supplied with electricity from an alternating current mains network having mains lines 1 and 2 via a rectifier-multiplier circuit 5. A mains switch 3 is connected to one of the mains lines.

The gas discharge lamp 6 is operated with direct current by means of the rectifier-multiplier circuit 5. The direct-voltage multiplier circuit 5 comprises a plurality of voltage-doubling stages connected in series with one another and of a type known per se.

As a result of the direct current operation, up to a 30% savings in energy is realized. Also, the lamp starts immediately upon being switched on, without any irritating flickering. As long as the gas discharge lamp 6 has not yet ignited, the rectifier-multiplier circuit 5 provides, at zero current, a very high voltage, which effects the ignition of the gas discharge lamp 6. After the ignition, the internal resistance of the gas discharge lamp 6 drops off substantially, so that the operating current is capable of increasing substantially.

A commutator switch 9 can additionally be disposed in the voltage supply to the gas discharge lamp 6. By the disposition of the commutator switch 9, the polarity is switched over while inactive upon each actuation of the gas discharge lamp 6, thereby preventing cataphoresis.

The commutator switch 9, which is embodied as a current surge commutator switch, is actuated by a relay coil (via connections indicated by dashed lines). The relay coil 4 is designed by way of example for 220 volts of alternating voltage. In order to switch ON the rectifier-multiplier circuit 5, a delay switch 10 is provided in a line leading to it, and the delay switch 10 switches a working contact 12. The circuit 10 may for example have a relay coil and a capacitor (not shown) connected parallel thereto, as a result of which a delayed switching ON of the working contact 12 is attained as compared with the switching ON effected by the mains switch 3 and with the commutation effected by the relay 4.

The relay in the delay circuit 10 trips within one-half period, that is, within approximately 10 msec at 50 Hz of alternating current. As a result of this embodiment, the rectifier-multiplier circuit 5 is connected to the mains voltage more than 10 msec later, for instance 50 msec later at the earliest, that is, 2.5 alternating-voltage periods, but efficaciously not more than 100 msec later.

As the commutator switch 9, a double-poled electromagnetic current surge alternating switch can be used.

The supply of electricity to the delay circuit 10 can be effected by way of example via a rectifier device (not shown) which is connected directly to the mains 1, 2.

Upon the application of the mains voltage via the mains switch 3, the commutation contacts of the commutator device 9 are switched over while inactive by means of the relay 4, so that the rectifier/voltage-multiplier device 5 does not yet function, since the working contact 12 is still open. Before the direct voltage generated by the rectifier/voltage-multiplier device 5 builds up and the ignition of the gas discharge lamp 6 can begin, the commutator device 9 has a polarity which is the opposite of that of the preceding operating period. Upon being shut OFF with the mains switch 3, the exciter coil 4 of the current surge commutator switch 9 does become currentless; however, the contact remains in its same position. Upon a renewed connection of the device to the mains, by the actuation of the mains switch 3, the commutator switch 9 first, with the coil 4 excited in a non-delayed manner, switches over the contact apparatus. Then, with a delay of selectable length but at least 50 msec, the connection of the rectifier-multiplier circuit 5 to the mains is effected, via the contact 12 which is closed by the delay circuit 10. Upon each closure of the mains switch 3, a switchover of the gas discharge lamp 6 while inactive is effected, i.e., before it is caused to ignite and burn by the rectifier-multiplier circuit 5. A cataphoresis effect in the gas discharge lamp 6 operated with direct current is thereby avoided.

The gas discharge occurring between the electrodes 7, 8, because of the corresponding gas contents of the gas discharge lamp 6, causes the generation of a UV radiation the energy of which suffices for generating ozone from oxygen (in the air). The generated UV radiation can enter into and emerge from the treatment chamber 15 through the glass tube 17 and there effect the conversion of $O_2$ into $O_3$.

The invention is not restricted to the exemplary embodiment shown and described herein. It also encompasses any modifications and further developments within the competence of one skilled in the art as well as partial or sub-combinations of the characteristics and provisions described and/or shown.

What is claimed is:

1. A method for generating ultraviolet radiation, preferably in the wavelength range between approximately $\lambda=150$ and $\lambda=350$ nanometers, wherein ozone is produced at about $\lambda=185$ nm and germicidal radiation is produced at about $\lambda=260$ nm, from electrical energy which is converted into radiation energy in low-voltage gas discharge tubes each having one pair of electrodes, wherein the material making up the walls of these tubes is highly transparent to the above $\lambda$ range and the interior of the tubes is filled with an appropriate mixture of gas vapor and mercury vapor, preferably for water purification, characterized in that the gas discharge lamp is powered from an alternating current source (50 or 60 Hz) using a supply circuit device dimensioned for the maintaining voltage and the maintaining current in the form of a voltage multiplier circuit made up of rectifier diodes and capacitors and using at least one ignition circuit furnishing high voltage and of comparatively lower output, the supply circuit and ignition circuit being combined into one voltage multiplier circuit comprising a plurality of voltage stages connected in series, and the gas discharge lamp is operated in direct-current operation, using a smoothing choke.

2. A method as defined by claim 1, characterized in that a commutator switch disposed between the rectifier-multiplier circuit and the gas discharge lamp switches over while inactive after the actuation of a mains switch, and a delay switch disposed in a supply line of the rectifier-multiplier circuit switches the rectifier-multiplier circuit ON, after the closure of the mains switch, in a delayed manner compared with the commutation process.

3. A method as defined by claim 1 or 2, characterized by the use of long-lasting cold-start sintered electrodes as the electrodes for the gas discharge lamp.

4. An apparatus for generating ultraviolet radiation in the wavelength range between approximately $\lambda=150$ and $\lambda=300$ nanometers, wherein ozone is produced in the wavelength range of $\lambda=185$ nm and germicidal radiation is produced in the wavelength range $\lambda=260$ nm, from electrical energy which is converted into radiation energy in low-voltage gas discharge tubes each having one pair of electrodes, wherein the material making up the walls of these tubes is known per se and highly transparent to the above λ range and the interior of which is filled with a mixture, known per se, of gas vapor and mercury vapor, preferably for water purification, characterized by a gas discharge lamp (6) in a treatment chamber (15) having an air supply tube (13) and air exhaust tube (14), with a gas-filled, UV-transparent tube (17) and with electrodes (7, 8) which are supplied from an alternating current mains network (1, 2) by a direct voltage multiplier circuit (5) and with an ON switch (3) connected to the mains network (1,2).

5. An apparatus as defined by claim 4, characterized by a commutator switch (9) disposed between the direct voltage multiplier circuit (5) and the gas discharge lamp (6), which switch (9) is actuated by an exciter coil (4), and by a delay circuit (10) disposed in a supply line of the rectifier-multiplier circuit (5), which delay circuit (10) switches the rectifier-multiplier circuit (5) ON via a controlled working contact (12) in a delayed manner compared with the commutation process.

6. An apparatus as defined by claim 4 or 5, characterized by a compressor (16) in the air supply line (13) leading to the treatment chamber (15).

7. An apparatus as defined by claim 4 or 5, characterized by long-lasting cold-start sintered electrodes as the electrodes (7, 8) of the gas discharge lamp (6).

* * * * *